(12) United States Patent
Chiang

(10) Patent No.: US 8,196,884 B2
(45) Date of Patent: Jun. 12, 2012

(54) DUAL-PURPOSE FIXING STAND FOR A COMPUTER SCREEN AND A KEYBOARD HOLDER

(76) Inventor: Vance Chiang, Taichung (TW)

( * ) Notice: Subject to any disclaimer, the term of this patent is extended or adjusted under 35 U.S.C. 154(b) by 514 days.

(21) Appl. No.: 12/387,003

(22) Filed: Apr. 28, 2009

(65) Prior Publication Data
US 2010/0270453 A1 Oct. 28, 2010

(51) Int. Cl.
*E04G 3/00* (2006.01)
(52) U.S. Cl. ............... 248/286.1; 248/118.1; 248/284.1; 248/288.31; 248/292.12; 248/920
(58) Field of Classification Search ............... 248/286.1, 248/285.1, 284.1, 288.31, 292.14, 118.1, 248/118.3, 118.5, 181.1, 181.2, 918, 919, 248/920, 299.1; 361/679.2, 679.21, 679.06, 361/679.07
See application file for complete search history.

(56) References Cited

U.S. PATENT DOCUMENTS

| | | | | |
|---|---|---|---|---|
| 5,211,367 A | * | 5/1993 | Musculus | 248/279.1 |
| 6,116,557 A | * | 9/2000 | Choy et al. | 248/286.1 |
| 6,135,404 A | * | 10/2000 | Wisniewski et al. | 248/281.11 |
| 6,557,943 B2 | * | 5/2003 | Ando | 297/463.1 |
| 2005/0121578 A1 | * | 6/2005 | Asamarai et al. | 248/284.1 |
| 2008/0029661 A1 | * | 2/2008 | Chen | 248/176.1 |

* cited by examiner

*Primary Examiner* — Gwendolyn Baxter

(57) ABSTRACT

A dual-purpose fixing stand for a computer screen and a keyboard holder includes: a main body, having an axial pivoting hole disposed at the middle of a distal surface at an end of an axle pivotal disk and a plurality of positioning grooves coaxially disposed around the external periphery of the axial pivoting hole; a universal connector, pivotally and axially coupled to another end of the axle pivotal disk, and a support plate coupled to the universal connector for selectively mounting the computer screen or the keyboard holder; a fixing base, having a support bottom selectively connected to the top or the bottom of a table, and two stand plates convexly disposed with an interval apart and at the top of a distal surface to accommodate and axially and pivotally couple the axle pivotal disk of the main body, and a positioning pin installed individually at positions on the lateral side corresponding to the positions of a plurality of positioning grooves of the axle pivotal disk for providing an elastic extension or retraction and elastically embedded into the positioning grooves to achieve the effect of limiting the position of an axial angle of the main body. Therefore, the fixing stand can be used for fixing a computer screen or a keyboard holder, and users can make an angular adjustment for its operation to enhance the users' operating comfort.

6 Claims, 6 Drawing Sheets

DUAL-PURPOSE FIXING STAND FOR A COMPUTER SCREEN AND A KEYBOARD HOLDER

BACKGROUND OF THE INVENTION

1. Field of the Invention

The present invention relates to a fixing device, in particular to a dual-purpose fixing stand for a computer screen and a keyboard holder.

2. Description of the Related Art

In general, office appliance fixing devices adopt a structural design of a single function, such as a computer screen fixing stand having a support base axially and pivotally coupled to the bottom of an LCD screen for installing the office appliance horizontally on a tabletop; a keyboard holder provided for placing a computer keyboard is designed as an extendable tabletop that can be pushed or moved horizontally on a computer desk. Regardless of a conventional LCD screen fixing stand or a keyboard holder, they cannot be used universally due to the structural design of a specific manufacturer of the computer desk or the screen, and the function provided for users to make an angular adjustment for its operation is very limited. Obviously, the conventional fixing stand cannot fully meet the consumer requirements.

SUMMARY OF THE INVENTION

Therefore, it is a primary objective of the present invention to provide a dual-purpose fixing stand for a computer screen and a keyboard holder, such that users can use the stand for selectively fixing and supporting a computer screen and a keyboard holder to provide a more universal application of the fixing stand.

Another objective of the present invention is to provide a dual-purpose fixing stand for a computer screen and a keyboard holder, such that users can make an angular adjustment to the computer screen or the keyboard holder to improve the user's operating comfort.

To achieve the aforementioned objectives, the present invention provides a dual-purpose fixing stand for a computer screen and a keyboard holder, comprising:

a main body, extended from a predetermined long axis, and having an axle pivotal disk with a larger diameter and disposed axially at an end of the main body, and an axial pivoting hole concavely disposed at the middle of a distal surface of the axle pivotal disk and a plurality of positioning grooves disposed concentrically around the external periphery of the axial pivoting hole; a universal connector, axially and pivotally coupled to another end of the main body and a support plate coupled to the universal connector, for selectively fixing the computer screen or the keyboard holder; and a fixing base, for selectively mounting a support bottom to a distal surface at the top or the bottom of a table, and having two stand plates protruded from a lateral side of the top of the distal surface, an axial pivoting hole individually disposed at the middle of the distal surfaces of the two stand plates, for accommodating, pivotally coupling and positioning the axle pivotal disk of the main body between the lateral sides of the two distal surfaces, and a positioning pin installed individually at positions on the lateral side corresponding to the positions of a plurality of positioning grooves of the axle pivotal disk for providing an elastic extension or retraction and elastically embedded into the positioning grooves to achieve the effect of limiting the position of an axial angle of the main body.

To make it easier for our examiner to understand the objects, characteristics and effects of the present invention, we use preferred embodiments together with accompanying drawings for the detailed description of the present invention.

DETAILED DESCRIPTION OF THE PREFERRED EMBODIMENTS

Figure 1:
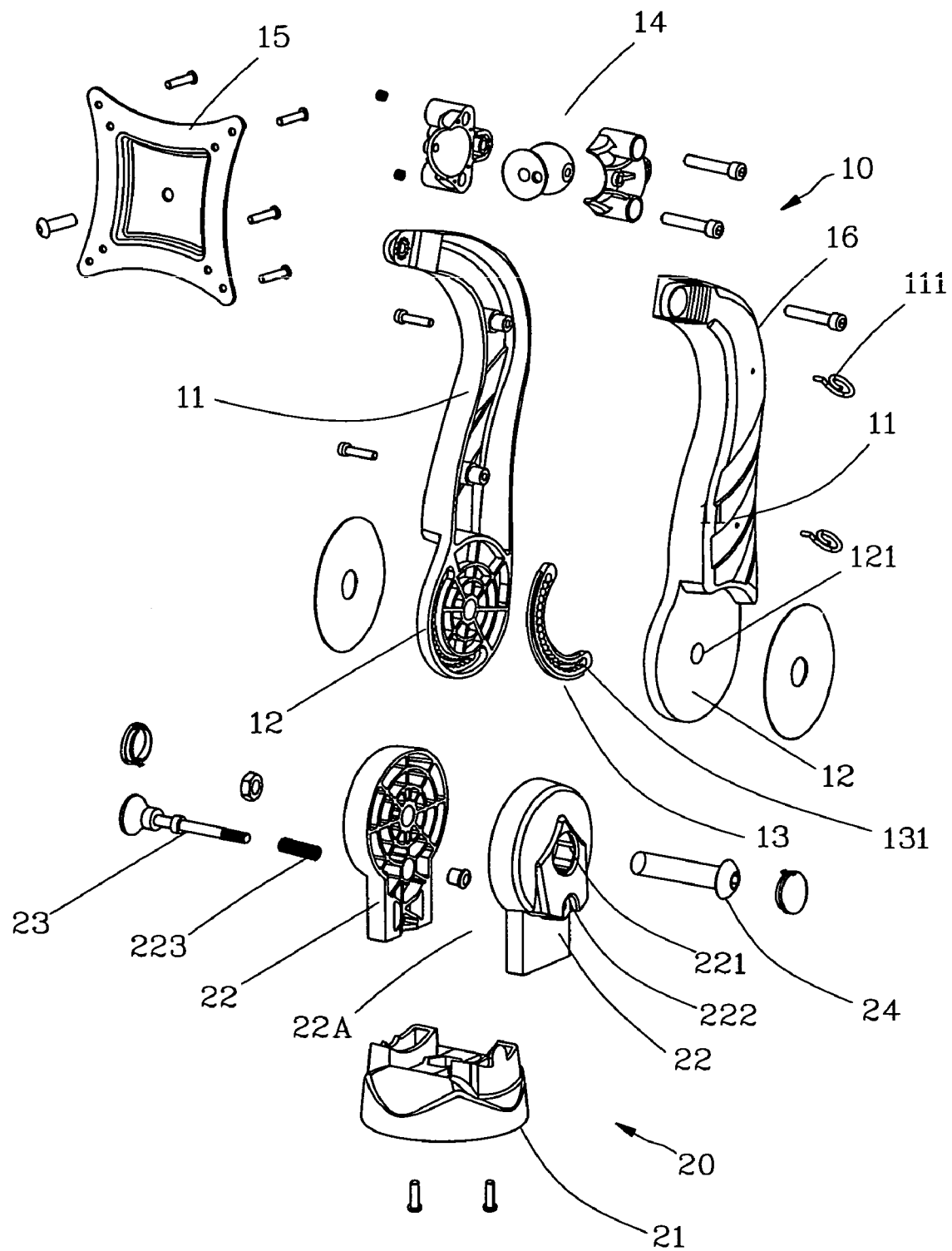
FIG. 1 is an exploded view of a preferred embodiment of the present invention.

With reference to FIGS. 1 to 6 for a dual-purpose fixing stand for a computer screen and a keyboard holder in accordance with the present invention, the fixing stand comprises a main body 10 and a fixing base 20.

The main body 10 is extended along a predetermined long axis, and the main body 10 of this preferred embodiment is formed by engaging left and right symmetric stand casings 11, and a lateral side of the main body 10 includes a plurality of elastic latch rings 111 for positioning and limiting conductive wires, an axle pivotal disk 12 having a larger diameter disposed axially from an end, an axial pivoting hole 121 concavely disposed at the middle of a distal surface, and a plurality of positioning grooves 131 disposed concentrically around the external periphery of the axial pivoting hole 121 to form an embedding element 13; a universal connector 14 and a support plate 15 being axially and pivotally coupled another end of the main body 10 for selectively mounting the computer screen 30 or the keyboard holder 40; and a curved neck 16 formed by tapering a distal shaft of the universal connector 14 into an arc shape, for providing an angle of elevation of a support operation.

The fixing base 20 includes a support bottom 21 selectively fixed to the top or the bottom of a table, two stand plates 22 convexly disposed at the top and with an interval apart from each other, an axial pivoting hole 221 disposed separately at the middle of a distal surface of the fixing base 20 for accommodating the axle pivotal disk 12 of the main body 10 between the two distal surfaces, and a center shaft 24 is passed through an axial pivoting hole 121 of the axle pivotal disk 12 and an axial pivoting hole 221 of the stand plate 22 for connecting the axle pivotal disk 12 and the stand plate 22 in series, and a positioning pin hole 222 is concavely disposed at an end of the stand plate 22 and at a position corresponding to the positioning groove 131 of the axle pivotal disk 12 for pivotally connecting a spring 223, and a positioning pin 23 is elastically embedded into the positioning groove 131 to limit and position an axial and pivotal angle of the main body 10. To facilitate the installation of the keyboard holder 40, the support bottom 21 is fixed to a slide slot base 26 and an embedding slide board 25 and slidably embedded between two parallel sides of the embedding slide board 25, so as to fix the support bottom 21 at the bottom of the table to provide a horizontal extension and sliding operations.

With the aforementioned assembly, a dual-purpose fixing stand for a computer screen and a keyboard holder is accomplished, and the fixing stand is used extensively and universally for installing the computer screen 30 and the keyboard holder 40.

Figure 2:
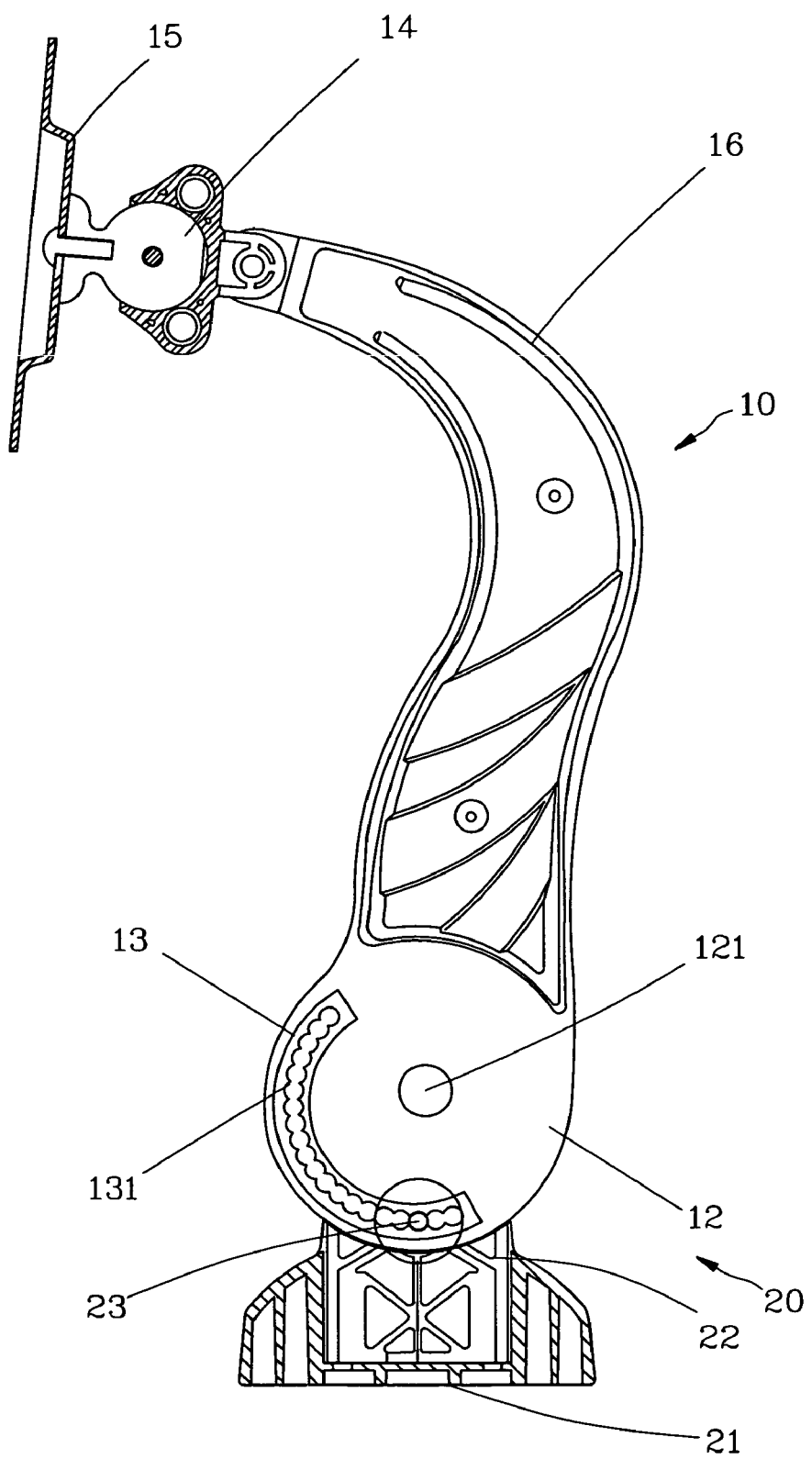
FIG. 2 is a partial cross-sectional side view of a longitudinally installed assembly in accordance with the present invention.
Figure 3:
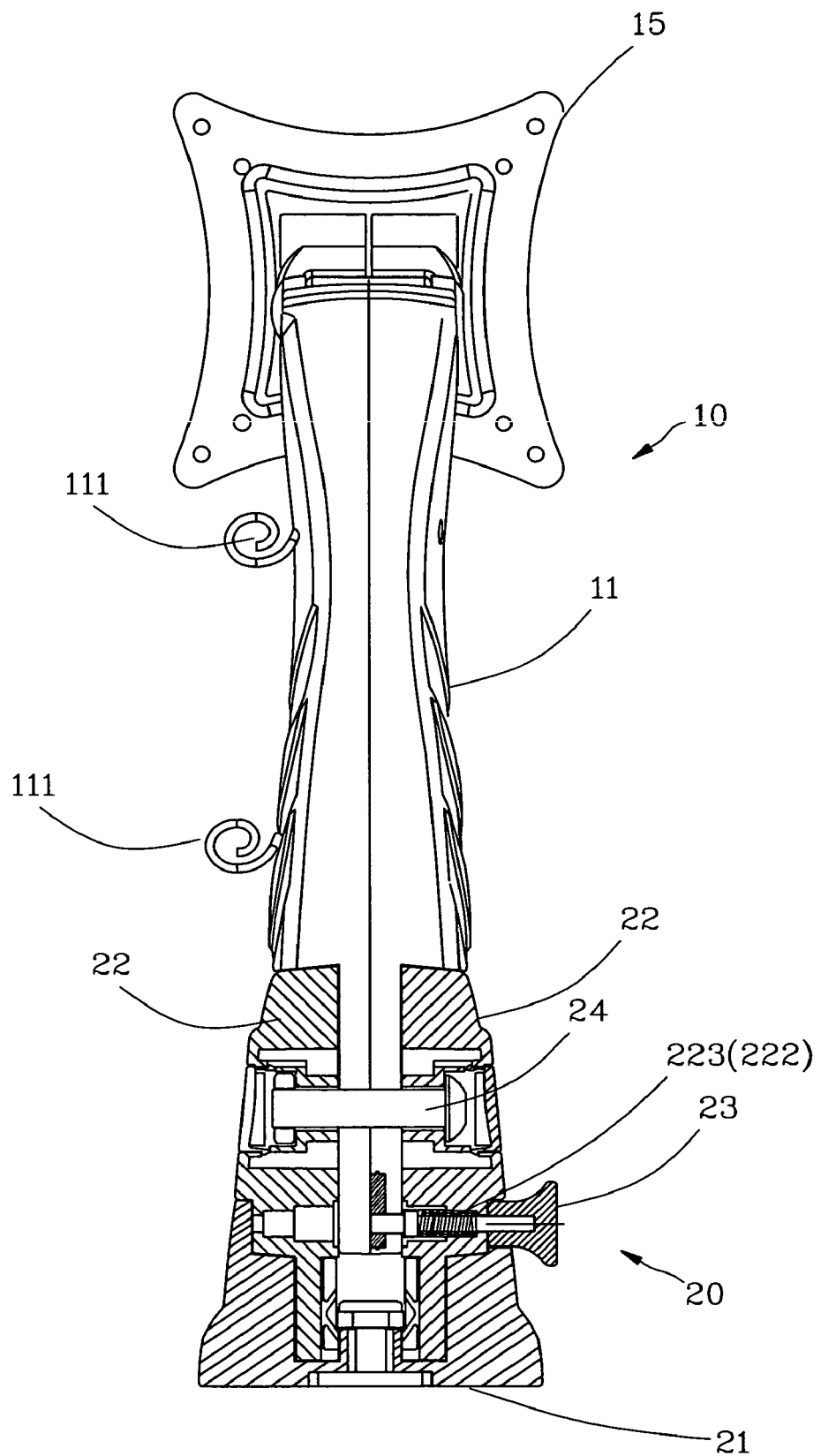
FIG. 3 is a partial cross-sectional longitudinal side view of a longitudinally installed assembly in accordance with the present invention.
Figure 4:
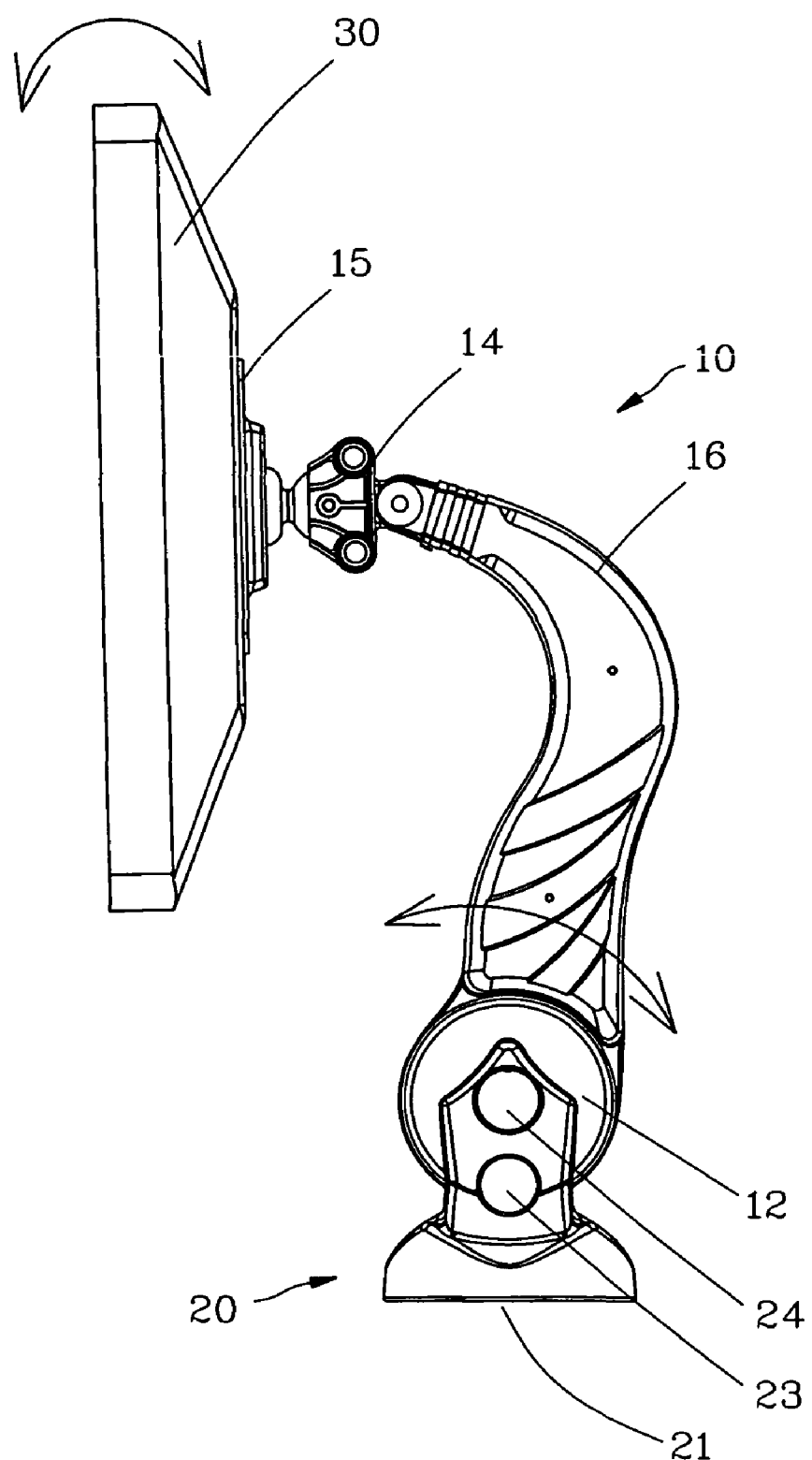
FIG. 4 is a schematic view of operating a longitudinally assembled computer screen in accordance with the present invention.

If the main body 10 is erected longitudinally as shown in FIG. 4, the computer screen 30 is mounted onto the support plate 1, and the bottom of the computer screen 30 is fixed to the fixing base 20 by screws or fixed to a tabletop by a general simple clamp. Since the arc curved neck 16 has a support with a smooth angle of elevation and the backside of the support plate 15 is turned and positioned by any permitted angle of the connected universal connector 14. In addition, the fixing base 20 and the axle pivotal disk 12 of the main body 10 as shown in FIGS. 2 and 3 are limited at the middle of the center shaft 24 and provided for making an angular adjustment of the front and rear axis of the main body 10, and the operating method is to separate the positioning pin 23 axially to embed the original shaft end into a positioning groove 131. Until the required angle is adjusted, the resilience of the spring 223 forces the positioning pin 23 to be embedded into another positioning groove 131 again and fixed into a position, such that different angles can be adjusted according to the user's requirement.

Figure 5:
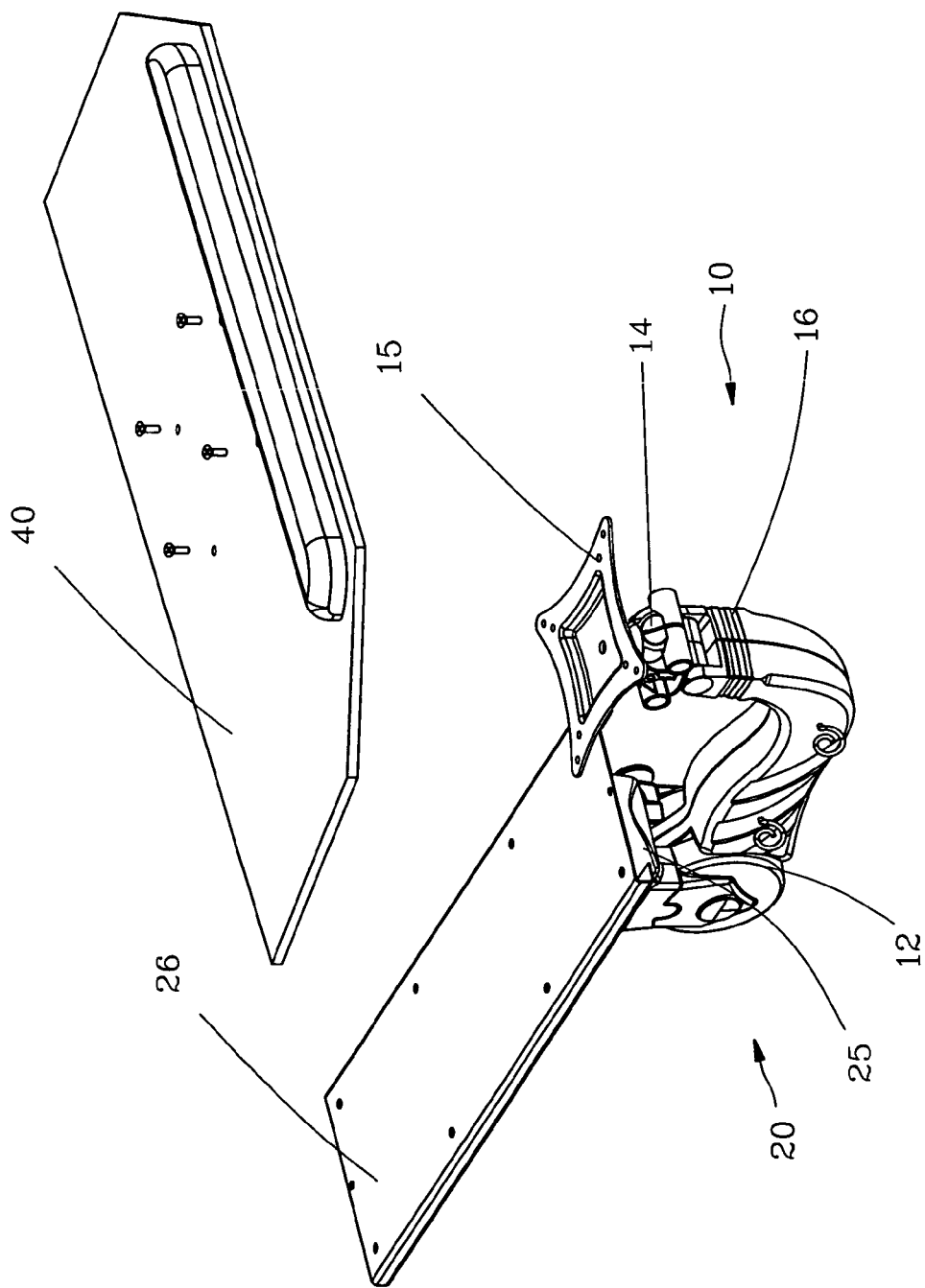
FIG. 5 is a perspective view of a transversally assembled keyboard holder in accordance with the present invention.
Figure 6:
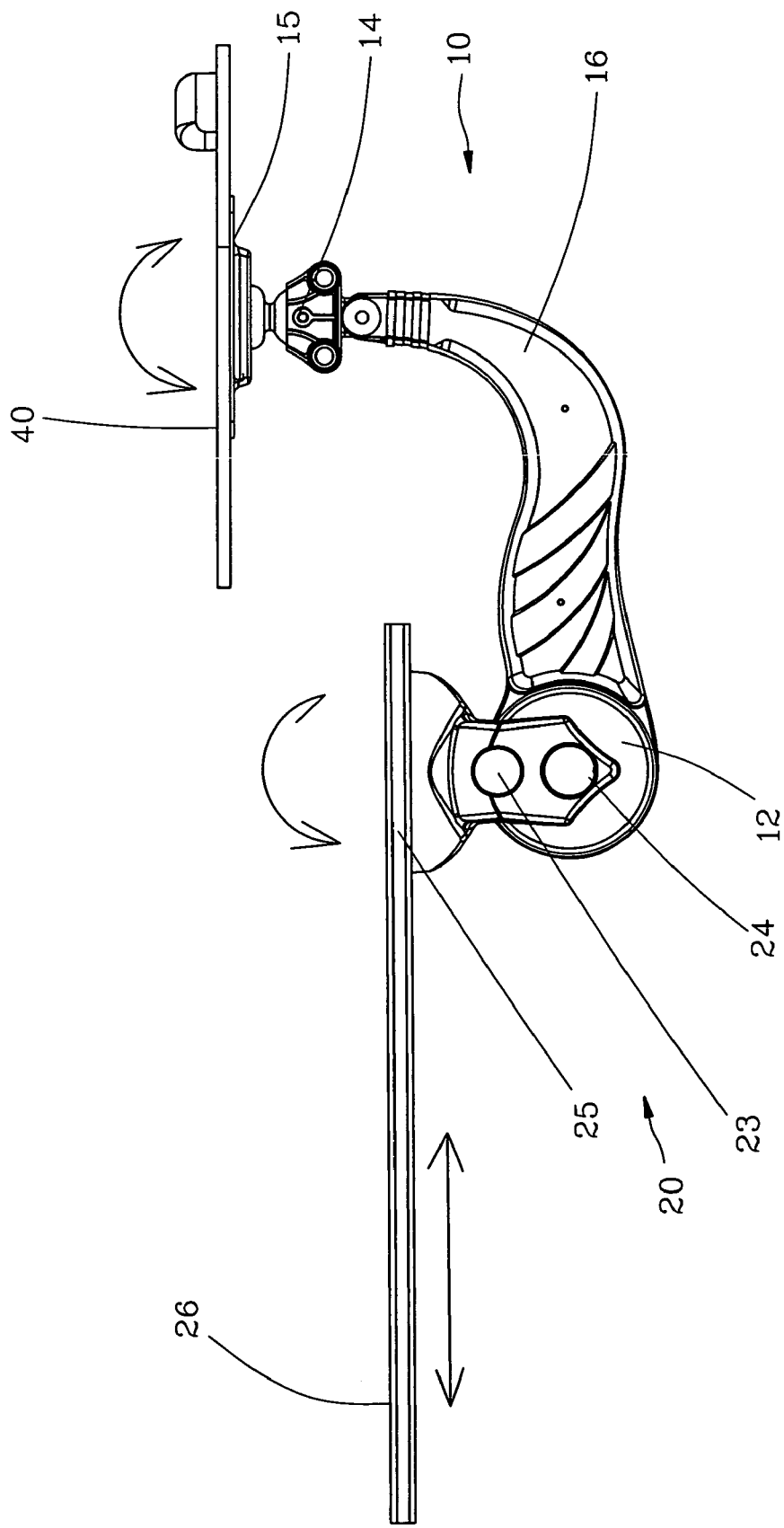
FIG. 6 is a schematic view of operating a transversally assembled keyboard holder in accordance with the present invention.

If the main body 10 is installed transversally as shown in FIGS. 5 and 6, the keyboard holder 40 is mounted onto the support plate 15, and the aforementioned adjusting method is used to axially turn the axial shaft of the fixing base 20 to an angle of 90 degrees, such that the support bottom 21 facing upward is fixed to the bottom of the tabletop in order to horizontally slide the keyboard holder 40 carried by the support plate 15 back and forth, and an embedding slide board 25 can be fixed onto the support bottom 21, and a slide slot base 26 is slidably embedded into two parallel sides as shown in FIG. 6, so as to fix the support bottom 21 to the bottom of the tabletop to provide horizontal extension and sliding operations. Similarly, the positioning pin 23 is used for the engagement and adjustment to further provide an adjustment of the angle of elevation of the keyboard holder 40. The present invention can satisfy personal needs and improve the user's operating comfort substantially.

While the invention has been described by means of specific embodiments, numerous modifications and variations could be made thereto by those skilled in the art without departing from the scope and spirit of the invention set forth in the claims.

What is claimed is:

1. A dual-purpose fixing stand for a computer screen and a keyboard holder, comprising:
a main body, extended from a predetermined long axis, and having an axle pivotal disk with a diameter disposed axially at a lateral end of the main body, an axial pivoting hole concavely disposed at a middle of a distal surface of the axle pivotal disk and having a plurality of positioning grooves concentrically disposed around the axial pivoting hole; a universal connector axially and pivotally coupled to another end of the main body, and a support plate coupled the universal connector, for selectively mounting the computer screen or the keyboard holder; and
a fixing base, having a support bottom selectively coupled to a distal surface at a top or a bottom of a table, two stand plates disposed at a lateral side of the distal surface at the top and convexly disposed with an interval from each other, an axial pivoting hole individually and concavely disposed at a middle of two stand plates, for accommodating, and axially and pivotally positioning the axle pivotal disk of the main body between the two distal surfaces, and a positioning pin disposed at an end side and corresponding to positions of the plurality of positioning grooves of the axle pivotal disk for a pivotal connection by an elastic axial extension, so as to elastically embed the positioning pin into the positioning groove to limit and position an axial and pivotal angle of the main body;
wherein the support bottom of the fixing base includes an embedding slide board and a slide slot base slidably engaged with the embedding slide board for fixing the support bottom of the fixing base to a bottom of a table top to provide a horizontal extension and sliding operation for the fixing base.

2. The dual-purpose fixing stand for the computer screen and the keyboard holder as recited in claim 1, wherein the main body includes a curved neck formed by tapering a distal shaft of the universal connector into an arc shape.

3. The dual-purpose fixing stand for the computer screen and the keyboard holder as recited in claim 1, wherein the main body includes a plurality of elastic latch rings disposed on a lateral side of the main body and having an interval from each other.

4. The dual-purpose fixing stand for the computer screen and the keyboard holder as recited in claim 1, wherein the main body is formed by combining left and right symmetric stand casings.

5. The dual-purpose fixing stand for the computer screen and the keyboard holder as recited in claim 1, wherein the fixing base includes a positioning pin hole concavely disposed at a distal side of the two stand plates, and a spring axially coupled to the positioning pin hole for providing an axial elastic force for the positioning pin.

6. The dual-purpose fixing stand for the computer screen and the keyboard holder as recited in claim 1, wherein the axial pivoting hole of the axle pivotal disk and the axial pivoting hole of the two stand plates are axially and pivotally combined with each other in series by a center shaft.

* * * * *